United States Patent [19]

Weiss

[11] 4,177,302
[45] Dec. 4, 1979

[54] TOP COAT COMPOSITION TO IMPROVE MARINE ANTIFOULING PERFORMANCE

[75] Inventor: Jonas Weiss, Portchester, N.Y.

[73] Assignee: Ciba-Geigy Corporation, Ardsley, N.Y.

[21] Appl. No.: 910,256

[22] Filed: May 30, 1978

[51] Int. Cl.$^2$ .......................... B32B 27/38; B63B 9/00
[52] U.S. Cl. ................................ 427/407 C; 427/386; 427/407 G; 427/410; 428/413
[58] Field of Search ................... 427/386, 410, 407 C, 427/407 G; 428/413

[56] References Cited

U.S. PATENT DOCUMENTS

| | | | |
|---|---|---|---|
| 3,575,123 | 4/1971 | Shepherd et al. | 428/907 X |
| 3,896,753 | 7/1975 | Shepherd et al. | 424/80 X |

FOREIGN PATENT DOCUMENTS

| | | | |
|---|---|---|---|
| 846293 | 1/1977 | Belgium | 427/160 |
| 1409048 | 10/1975 | United Kingdom | 427/385 R |

*Primary Examiner*—James R. Hoffman
*Attorney, Agent, or Firm*—Joseph F. DiPrima

[57] ABSTRACT

A process of employing a coating to control toxicant leaching rate of a marine antifouling paint and thus, to extend its useful lifetime is disclosed. An ambient-temperature curing system is made from water soluble or dispersible hydantoin epoxy resins, a water dispersible polyamido amine, and optionally with an inhibitor, an accelerator and a swelling agent. A water swellable, thermoset coating which is permeable to antifouling compounds results.

8 Claims, No Drawings

TOP COAT COMPOSITION TO IMPROVE MARINE ANTIFOULING PERFORMANCE

DETAILED DISCLOSURE

This invention relates to an improved process for controlling the rate of leaching of a toxicant from a marine antifouling paint by applying on the surface of the paint an incompletely cured topcoat derived from ambient-temperature curing system comprising a hydantoin compound, which contains at least two epoxide groups per molecule and is soluble or dispersible in water, an a polyamido-amine, which is dispersible in water, in a stoichiometry of 0.8 to 1.2 equivalents of amine per epoxide equivalent.

The hydantoin compounds employed herein include diglycidyl derivatives of 5,5-dilower-alkylhydantoins which have the following formula

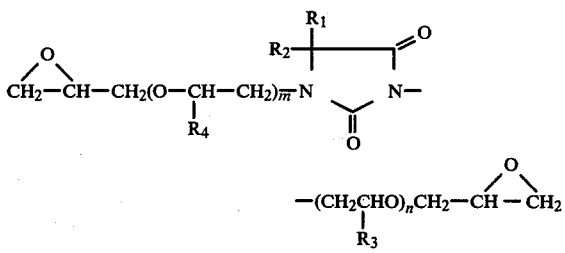

in which $R_1$ and $R_2$ each denote a lower alkyl residue having 1 to 4 carbon atoms, $R_3$ and $R_4$ denote a hydrogen atom or a lower alkyl residue having 1 to 2 carbon atoms and n and m represent an integer of 0 to 4.

The lower alkyl group employed herein includes both linear and branched chained alkyl groups, examples of which are methyl, ethyl, propyl, isopropyl, butyl and isobutyl.

Preferably, $R_1$ is methyl, $R_2$ is methyl or ethyl, $R_3$ and $R_4$ are hydrogen or methyl, n is zero or one and m is zero.

Most preferably, the hydantoin compounds are N,N'-diglycidyl-5,5-dimethylhydantoin ($R_1$ and $R_2$ are methyl, n and m are zero), N,N'-diglycidyl-5-ethyl-5-methylhydantoin ($R_1$ is methyl, $R_2$ is ethyl, n and m are zero), N-glycidyl-N'-(glycidyloxy-2'-propyl)-5,5-dimethylhydantoin ($R_1$ and $R_2$ are methyl, n is one, $R_3$ is methyl and m is zero) and mixtures thereof.

The polyamido-amine employed herein includes the condensation product of a polymerized fatty acid with an excess of a polyamine in such a stoichiometry so that the resultant product has an amine value (mg/KOH/gm) of 250 to 400.

The polymerized fatty acid is exemplified by the commercial product known as Empol "Dimer" and "Trimer" acids which are produced by the polymerization of $C_{18}$ unsaturated fatty acids. The $C_{18}$ unsaturated fatty acids are comprised of monofunctional acids such as oleic, ricinoleic, petroselinic, vaccenic, linoleic, limolenic, eleostearic, punicic, licanic and parimaric acids.

The polyamine employed herein condensed with the polymerized fatty acids may be an aliphatic, cycloaliphatic or heterocyclic primary and secondary amine. Examples of such polyamines are aliphatic amines such as, diethylenetriamine, triethylenetetramine, N-(2-hydroxyethyl)-, N-(2-hydroxypropyl)-, and N-(2-cyanoethyl)diethylenetriamine, tetraethylenepentamine, ethylenediamine, 1,2-diaminopropane, 1,3-diaminopropane, 2,2,4- and 2,3,3-trimethylhexamethylenediamine, hexamethylenediamine, N-N-dimethylpropylenediamine, N,N-diethylpropylenediamine; cycloaliphatic amines such as bis(4-aminocyclohexyl)methane, bis(4-amino-3-methylcyclohexyl)methane, 2,2-bis(4-aminocyclohexyl)propane, and 3-aminomethyl-3,5,5-trimethylcyclohexylamine; and heterocyclic amines such as N-aminoethylpiperazine.

The most preferred polyamido amines are CIBA-GEIGY Polyamide 840 which is a medium molecular weight, low viscosity, very high amine content hardener for epoxy resins produced by the condensation of polymerized fatty acids and selected polyamines and HEXAGON ENTERPRISES' CASAMID® 360 which is a 50% solution of reactive polyamido-amine in water.

In addition to the hydantoin compound and the polyamidoamine, the ambient-temperature curing system may further comprise of a volatile reaction inhibitor, an epoxy-amine accelerator, a hydrophilic solvent, wetting agents, flow control additives and thickeners.

The volatile reaction inhibitor employed herein may include lower molecular weight alkanones with a volatility greater than or equal to that of water. The preferred lower molecular weight alkanones are 2-propanone and 2-butanone. The volatile reaction inhibitor has a temporary inhibiting effect which dissipates upon the drying of the coating.

The epoxy-amine accelerator employed herein may include primary aliphatic polyamines or tertiary amine, phenols, amides and sulfonamides, hydroxyamines or compounds containing more than one of the above functional groups. Examples of such primary aliphatic polyamines are linear and branched aliphatic polyamines such as, ethylene diamine, propylenediamine, hexamethylenediamine, ethyleneglycol-bis-propylamine, diethylene glycol-bis-proplyamine, diethylenetriamine, iminobispropylamine, bis(hexamethylene)triamine, triethylenetriamine, tetraethylenepentamine, pentaethylenehexamine, 1,2-diaminopropane, 1,2-diamino-2-methylpropane, 1,2-diaminobutane, 2,2,4- and 2,3,3-trimethylhexamethylenediamine, alicyclic polyamines such as, menthanediamine, 1,3- and 1,4-diaminocyclohexane, N-aminoethylpiperazine, isophronediamine, bis(4-aminocyclohexyl)methane, bis(4-amino-3-methylcyclohexyl)methene and 2,3-bis(aminocyclohexyl)propane. Examples of such tertiary amines are benzyldimethylamine, triethylamine, tripropylamine, tributylamine, N-methylmorpholine, 1,4-diazabicyclo(2.2.2)octane, and hexamethylenetetramine. Examples of such phenols are phenol, hydroquinone, resorcinol, phloroglucinol, 1,5- and 1,6-naphthalenediol, bisphenol-A, bisphenol-F, 1,3-bis(p-hydroxycumyl)benzene and phenolic resins. Examples of such amides and sulfonamides are acetamide, urea, salicamide, benznesulfonamide, toluene sulfonamide, and N-ethyl-o- and -p-toluene sulfonamides. Examples of such hydroxyamines are diethanolamine, triethylanolamine, tris(hydroxymethyl)aminomethane, o- and p-aminophenol,m-diethylaminophenol and dimethylaminophenol. The epoxy-amine accelerator may be constitute up to 10 percent by weight of the epoxy resin in the curing system. The preferred accelerator, Jefferson Accelerator 398, is a mixture of hydroxyamines as exemplified above.

The hydrophilic solvent employed herein have a volatility lower than that of water and may be glycol ethers or alcohols. Such glycol ethers include 2- methoxyethanol, 2-butyoxyethanol, 2-ethoxyethanol, 3-ethoxy-1-propanol, 3-methyl-1-butanol, 2-(2-butoxyethoxy)ethanol, 2-(2-ethoxyethoxy-ethanol, 2-ethoxyethyl ether, 2-(2-methoxyethoxy)-ethanol, diethyleneglycol dimethylether, triethylenelglycol dimethyl ether and tetraethyleneglycol dimethyl ether. Such alcohols include linear and branched aliphatic alcohols such as, 2-methyl-1-butanol, 3-methyl-1-butanol, 3-methyl-2-butanol, 1-pentanol, 2-methyl-2-pentanol, 2-methyl-3-pentanol, 3-methyl-2-pentanol, 3-methyl-3-pentanol, 4-methyl-1-pentanol, 4-methyl-2-pentanol, 1-hexanol, 2-methyl-2-hexanol, and 2-methyl-3-hexanol, alicyclic alcohols such as cyclohexanol, 1,2- and 1,3- and 1,4-cyclohexanediol, cyclopentanol, 1,3-cyclopentanediol, 1-cyclopentylethanol, 3-cyclopentyl-1-propanol, cyclohexylmethanol, cyclohexyl-1-ethanol, and cycloheptanol. The hydrophilic solvent may constitute up to 20 percent by volume of the total volatiles of the curing system. Protective colloids, thickners and wetting agents are useful in stabilizing the aqueous dispersion and in forming uniform films on drying. Examples of these are fumed silica, carboxymethyl cellulose, polyvinyl alcohol and the nonionic surfactants Foamster NS-1 (from Diamond Shamrock) and Surfynol 104 (tetramethyl decynediol from Air Products).

The ambient-curing systems, in the form of a dispersion, have pot life of up to 4 hours. Coatings prepared from these dispersions dry and become tack-free and hard within 24 hours at ambient temperatures. Within one week these coatings fully cure and exhibit good water and solvent resistance, adhesion, flexibility and impact and weather resistance. The cured coatings exhibit good chemical resistance on long-term immersion in aromatic solvents, gasoline, ketones, aqueous salt solutions, aqueous ammonia and aqueous hydrochloric acid. The cured coatings exhibit water pickup from 30 to 100 percent of their dry weight.

The coating is applied over commercially available antifoulant-painted surfaces, especially those containing tinbased toxicants. The toxicant diffuses from the antifouling paint through the water-swollen cured epoxide coating before being washed away from the surface. Toxicant loss is thus limited and more uniform than from an untreated paint surface. At an appropriate rate of toxicant loss, achieved by the described coating, an activity level sufficient to prevent fouling by barnacles, algae, hydroids and other fouling organisms is maintained for a much longer period than with an untreated antifouling paint.

The antifouling paints that may be used herein to afford the painted substrate to be coated by the composition of the instant invention may include:

Antifouling Paint A — 13.8% Tributyltin fluoride in a vinyl/rosin carrier.

Antifouling Paint B — 6.9% bis(tributyltin)oxide in a vinyl carrier.

Antifouling Paint C — 11.7% tributyltin fluoridein a vinyl/gum rosin carrier.

To further illustrate the nature of this invention and the process employed to prepare the water-borne, ambient-temperature coating system and the application thereof to antifoulant-painted surfaces the following examples are given below.

A. Preparation of Ambient-temperature Curing Systems

EXAMPLE 1—FORMULATION I

To polyamidoamine, HEXAGON ENTERPRISES' CASAMID ® 360, (29.1 parts of 50% reactive material in water) which is rapidly stirred at ambient-temperature is added water (35.6 parts) to afford a dispersion of curing agent. To hydantoin compound, consisting of 70% N,N'-diglycidyl-5,5-dimethylhydantoin and 30% N-glycidyl-N'-(glycidyloxy-2'-propyl)-5,5-dimethyl hydantoin, (25.4 parts) and volatile reaction inhibitor, acetone, (9.9 parts) was blended by manual agitation said dispersion of curing agent to yield Formulation I.

In a similar manner, water-borne, ambient-temperature curing systems may be prepared by substituting for the hydantoin compound of Example I the following:

N,N'-diglycidyl-5,5-dimethylhydantoin
N,N'-diglycidyl-5-ethyl-5-methylhydantoin
N,N'-diglycidyl-5-butyl-5-methylhydantoin
N-glycidyl-N'-(glycidyloxy-2-propyl)-5,5-dimethylhydantoin
N-glycidyl-N'-(glycidyloxy-2'-ethyl)-5,5-dimethylhydantoin, and
N-glycidyl-N'-(glycidyloxy-2'-propyl)-5-ethyl-5-methylhydantoin

EXAMPLE 2—Formulation II

To water (42.0 parts) which is rapidly stirred at 55° C. is added polyamido-amine, CIBA-GEIGY Polyamide 840, (10.5 parts) to afford a dispersion of curing agent. To said mixture is then added an epoxy-amine accelerator, (Jefferson Accelerator 398 0.21 parts) to obtain a hardener composition. To hydantoin compound, consisting of 70% N,N'-diglycidyl-5,5-dimethylhydantoin and 30% N-glycidyl-N'-(glycidyloxy-2'-propyl)-5,5-dimethyl hydantoin, (10.5 parts), volatile reaction inhibitor, acetone, (31.5 parts) and hydrophilic solvent, bis-(2-methoxyethyl) ether, (5.3 parts) was blended by manual agitation said hardener composition to yield Formulation II.

In a similar manner, waterborne, ambient-temperature curing systems may be prepared by substituting for the hydantoin compound of Example 2 the following:

N,N'-diglycidyl-5,5-dimethylhydantoin
N,N'-diglycidyl-5-ethyl-5-methylhydantoin
N,N'-diglycidyl-5-butyl-5-methylhydantoin
N-glycidyl-N'-(glycidyloxy-2-propyl)-5,5-dimethylhydantoin
N-glycidyl-N'-(glycidyloxy-2'-ethyl)-5,5-dimethylhydantoin, and
N-glycidyl-N'-(glycidyloxy-2'-propyl)-5-ethyl-5-methylhydantoin For the physical properties of CIBA-GEIGY Polyamide 840 and HEXAGON ENTERPRISES' CASAMID ® 360 are listed in the table below:

| Properties | Polyamide 840 | CASAMID ® 360 |
| --- | --- | --- |
| Amine Value (mg/ KOH/gm) | 350–400 | 140–180 (280–360) [a] |
| Viscosity, Gardner-Holt | $Z_2$–$Z_4$ (40° C.) | |
| Brookfeld | | 200–400 poise (25° C.) |
| Color, Gardener (Max.) | 12 | 15 |
| Specific Gravity | 0.971 (25° C.) | 1.050 (20° C.) |

[a] Amine value based on 100% solids.

B. Preparation of Test Samples

Antifouling paints are applied according to manufacturers recommendation (i.e., by brush) to both sides of a sanded and cleaned polyester/fiberglass panel. Painted panels are allowed to dry for 3 days before the application of the ambient-temperature curing system. The application of said curing systems (Formulations I and II) was accomplished by employing a spray gun. The resultant coatings had a dry film thickness of about one mil. The cured coating of Formulation I exhibited a water pickup of 35 percent of its dry weight and a water vapor transmission of 120 gram-mil/m²-ATM.-Day. The cured coating of Formulation II exhibited a water pickup of 32 percent of its dry weight and a water vapor transmission of 930 gram-mil/m²-ATM.-Day.

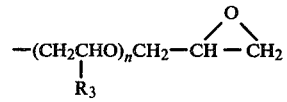

in which $R_1$ and $R_2$ each denote a lower alkyl residue having 1 to 4 carbon atoms, $R_3$ and $R_4$ each denote a hydrogen atom or a lower alkyl residue having 1 to 2 carbon atoms and n and m each represent an integer from 0 to 4, which is soluble in or dispersible in water.

C. Test Results

The table below was compiled from test data from Miami Marine Laboratories in Florida. They immersed and regularly observed polyester/fiberglass panels which had been painted and coated according to the process of the instant invention

ANTIFOULING TEST DATA

| Antifouling Paint | Topcoat Formulation | 1-Month Results* % Not Fouled | No. of Barnacles | 2-Month Results* % Not Fouled | No. of Barnacles | 3-Month Results* % Not Fouled | No. of Barnacles | 4-Month Results* % Not Fouled | No. of Barnacles | 5-Month Results* % Not Fouled | No. of Barnacles | 6-Month Results* % Not Fouled | No. of Barnacles |
|---|---|---|---|---|---|---|---|---|---|---|---|---|---|
| A | None | 100 | 0 | 94 | 0 | 25 | 64 | 0 | >100 | 0 | >100 | 0 | >100 |
|   | I | 92 | 0 | 88 | 4 | 22 | 53 | 17 | 53 | 10 | 60 | 12 | 61 |
|   | II | 85 | 0 | 78 | 0 | 75 | 0 | 73 | 0 | 73 | 0 | 60 | 16 |
| B | None | 92 | 0 | 34 | 58 | 0 | >100 | 0 | >100 | — | — | — | — |
|   | I | 91 | 0 | 68 | 25 | 0 | >100 | 0 | >100 | — | — | — | — |
|   | II | 91 | 0 | 84 | 8 | 8 | 100 | 0 | >100 | — | — | — | — |
| C | None | 100 | 0 | 91 | 2 | 23 | 46 | 24 | 59 | 1 | 83 | 0 | >100 |
|   | I | 88 | 0 | 83 | 0 | 55 | 18 | 47 | 19 | 47 | 19 | 45 | 20 |
|   | II | 78 | 0 | 70 | 0 | 78 | 0 | 60 | 0 | 58 | 0 | 40 | 10 |

*Average of 2 sides

In summary, when antifouling Paint A was employed as the toxicant source coating of the painted surfaces of test panel with Formulation II increased the effectiveness against fouling by barnacles from 2 months to greater than 6 months and by barnacles and algae from 2½ months to 5½ months when immersed in the waters of Biscayne Bay in Florida. Similar increases in effectiveness were observed when antifouling Paint B, and antifouling Paint C wherein effectiveness against barnacles increased 1 to 2 months, and 2½ to 6 months and effectiveness against barnacles and algae increased 1½ to 2 months, and 2½ to 3 months respectively.

What is claimed is:

1. An improved process for controlling the rate of leaching of toxicant from a marine antifouling paint by applying on the surface of the paint an incompletely cured topcoat and allowing it to cure thereon, wherein the improvement comprises the topcoat being derived from an ambient-temperature curing system which comprises (1) a diglycidyl derivative of 5,5-dilower-alkylhydantoins which have the following formula

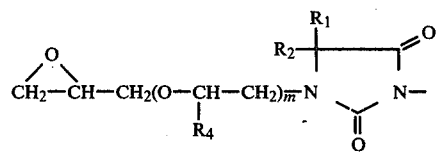

(2) a polyamidoamine, which is dispersible in water, in a stoichiometry of 0.8 to 1.2 equivalents of amine per epoxide equivalent.

2. A process according to claim 1, wherein the polyamidoamine is the condensation product of a polymerized fatty acid with an excess of polyamine having an amine value of 250 to 400.

3. A process according to claim 1, wherein the ambient-temperat ure curing system further comprises a volatile alkanone reaction inhibitor having a volatility greater than or equal to that of water.

4. A process according to claim 3, wherein the hydantoin compound is selected from the group consisting of N,N'-diglycidyl-5,5-dimethylhydantoin, N,N'-diglycidyl-5-ethyl-5-methylhydantoin, N-glycidyl-N'-(glycidyloxy-2'-propyl)-5,5-dimethylhydantoin or mixture thereof.

5. A process according to claim 3, wherein the ambient-temperature curing system further comprises an epoxyamine accelerator at a concentration of up to 10 percent by weight of the hydantoin compound.

6. A process according to claim 5 wherein, the ambient-temperature curing system further comprises a hydrophilic solvent, having a volatility lower than that of water, at an amount of up to 20% by volume of the total volatile content of said curing system.

7. A process according to claim 1, wherein said topcoat has a water pickup of 30 to 100 percent of its dry weight.

8. An ambient-temperature cured system according to claim 1.

* * * * *